(12) United States Patent
Shetty

(10) Patent No.: US 11,740,642 B2
(45) Date of Patent: Aug. 29, 2023

(54) DYNAMIC SELECTION OF DESTINATIONS FOR AUTONOMOUS CARRIERS

(71) Applicant: VMWARE, INC., Palo Alto, CA (US)

(72) Inventor: Rohit Pradeep Shetty, Bangalore (IN)

(73) Assignee: VMware, INC., Palo Alto, CA (US)

( * ) Notice: Subject to any disclaimer, the term of this patent is extended or adjusted under 35 U.S.C. 154(b) by 278 days.

(21) Appl. No.: 17/019,403

(22) Filed: Sep. 14, 2020

(65) Prior Publication Data

US 2022/0035385 A1 Feb. 3, 2022

(30) Foreign Application Priority Data

Jul. 28, 2020 (IN) .............................. 202041032298

(51) Int. Cl.
| | |
|---|---|
| *G05D 1/12* | (2006.01) |
| *G10L 19/018* | (2013.01) |
| *G06Q 50/30* | (2012.01) |
| *G06Q 50/28* | (2012.01) |
| *G06Q 10/083* | (2023.01) |
| *G05D 1/10* | (2006.01) |
| *G05D 1/00* | (2006.01) |
| *H04L 9/40* | (2022.01) |
| *G05D 1/02* | (2020.01) |

(52) U.S. Cl.
CPC .............. *G05D 1/12* (2013.01); *G05D 1/0088* (2013.01); *G05D 1/101* (2013.01); *G06Q 10/083* (2013.01); *G06Q 50/28* (2013.01); *G06Q 50/30* (2013.01); *G10L 19/018* (2013.01); *H04L 63/0428* (2013.01); *G05D 1/0212* (2013.01); *G05D 1/0255* (2013.01); *G05D 1/0276* (2013.01)

(58) Field of Classification Search
CPC ...... G05D 1/101; G06Q 10/083; G06Q 50/28; G06Q 50/30; G10L 19/018; H04L 63/0428; H04B 11/00; H04W 12/03; H04W 12/06
USPC ............................................................ 701/16
See application file for complete search history.

(56) References Cited

U.S. PATENT DOCUMENTS

| | | | | |
|---|---|---|---|---|
| 6,529,602 | B1 * | 3/2003 | Walker ..................... | H04K 1/00 380/283 |
| 9,069,795 | B2 * | 6/2015 | Atsmon ............. | G06Q 30/0603 |
| 10,733,601 | B1 * | 8/2020 | Osborn ................. | H04W 12/33 |
| 10,949,830 | B1 * | 3/2021 | Gaudin ................ | G06Q 20/327 |
| 2003/0165239 | A1 * | 9/2003 | Bantz ....................... | H04K 1/00 380/53 |
| 2008/0051947 | A1 * | 2/2008 | Kemp .................... | G08G 5/006 701/3 |
| 2012/0177297 | A1 * | 7/2012 | Everingham .......... | G06V 20/62 382/229 |
| 2015/0178721 | A1 * | 6/2015 | Pandiarajan ..... | G06K 19/06112 705/64 |
| 2015/0248640 | A1 * | 9/2015 | Srinivasan ........... | G05D 1/0676 705/338 |

(Continued)

*Primary Examiner* — Tuan C To
*Assistant Examiner* — Dominick Mulder
(74) *Attorney, Agent, or Firm* — Thomas | Horstemeyer, LLP

(57) ABSTRACT

Examples of the disclosure are directed to dynamic selection of a specific location at a destination for delivery or transfer of an item. A connected speaker can communicate with an autonomous carrier using an audio signal. The audio signal can contain identifying information associated with the specific location. The autonomous carrier can complete delivery of the item at the specific location.

19 Claims, 4 Drawing Sheets

(56) References Cited

U.S. PATENT DOCUMENTS

| | | | |
|---|---|---|---|
| 2015/0281273 A1* | 10/2015 | Shields | H04L 9/32 |
| | | | 713/171 |
| 2015/0302187 A1* | 10/2015 | Verma | G06Q 20/3572 |
| | | | 726/9 |
| 2016/0165343 A1* | 6/2016 | Hsu Huang | H04R 3/00 |
| | | | 381/77 |
| 2018/0196417 A1* | 7/2018 | Iagnemma | G05D 1/0027 |
| 2020/0005295 A1* | 1/2020 | Murphy | G06Q 20/405 |
| 2020/0007338 A1* | 1/2020 | Oh | H04L 9/008 |
| 2020/0175473 A1* | 6/2020 | Stenneth | G06Q 10/083 |
| 2020/0310408 A1* | 10/2020 | Carper | B64C 39/024 |
| 2021/0127260 A1* | 4/2021 | Lee | B60R 25/209 |
| 2021/0166569 A1* | 6/2021 | Hong | H04W 76/11 |
| 2021/0224759 A1* | 7/2021 | Zorzano Blasco | |
| | | | G06Q 20/0655 |

* cited by examiner

DYNAMIC SELECTION OF DESTINATIONS FOR AUTONOMOUS CARRIERS

RELATED APPLICATIONS

Benefit is claimed under 35 U.S.C. 119(a)-(d) to Foreign Application Serial No. 202041032298 filed in India entitled "DYNAMIC SELECTION OF DESTINATIONS FOR AUTONOMOUS CARRIERS", on Jul. 28, 2020, by VMware, Inc., which is herein incorporated in its entirety by reference for all purposes.

BACKGROUND

Autonomous vehicles or carriers can be used to transfer items from one location to another. For example, on a corporate campus, items can be transferred from one building to another. In a residential context, items can be delivered to a user's home or office. Users might have designated drop off locations that are permanently marked or otherwise tagged. In some instances, users might wish to vary a drop off location depending upon the environmental conditions or properties of the items that are being delivered to the user's destination.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

DETAILED DESCRIPTION

Autonomous carriers, such as land or air vehicles, can be employed to transfer or delivered items in various environments. For example, packages can be transported by vehicles over roads, sometimes across long distances. Additionally, drone aircraft can also be utilized to transfer or deliver items in various environments. Either type of vehicle facilitating transferring or delivery of items can be autonomous. While a destination can be specified by a system dispatching an autonomous carrier, a specific location at the destination might vary depending upon environmental conditions. Additionally, users might not wish to designate and clear a permanent delivery location and may opt to provide a delivery location only when an autonomous carrier is delivering items to the destination.

For example, a delivery location may be available at one point in time but then obstructed at a later point in time. A user or enterprise might designate a loading dock as a delivery location or destination, but the availability of specific docks or bays within a loading dock area can vary throughout the day. As another example, the driveway of a commercial or residential location might be available or unavailable at different times in a particular day. In that context, various embodiments for dynamically selecting a specific location for delivery at a specified destination are disclosed. Examples of the disclosure can utilize a voice assistant device or connected speaker that can perform localized communication with an autonomous carrier to communicate the selection of a specific location for delivery or docking at a specified destination. Audible or inaudible audio signals can be utilized to communicate with an autonomous carrier, which can be useful particularly in cases where the vehicle may not be equipped with a network interface or may not have network connectivity at the time of delivery.

Figure 1:
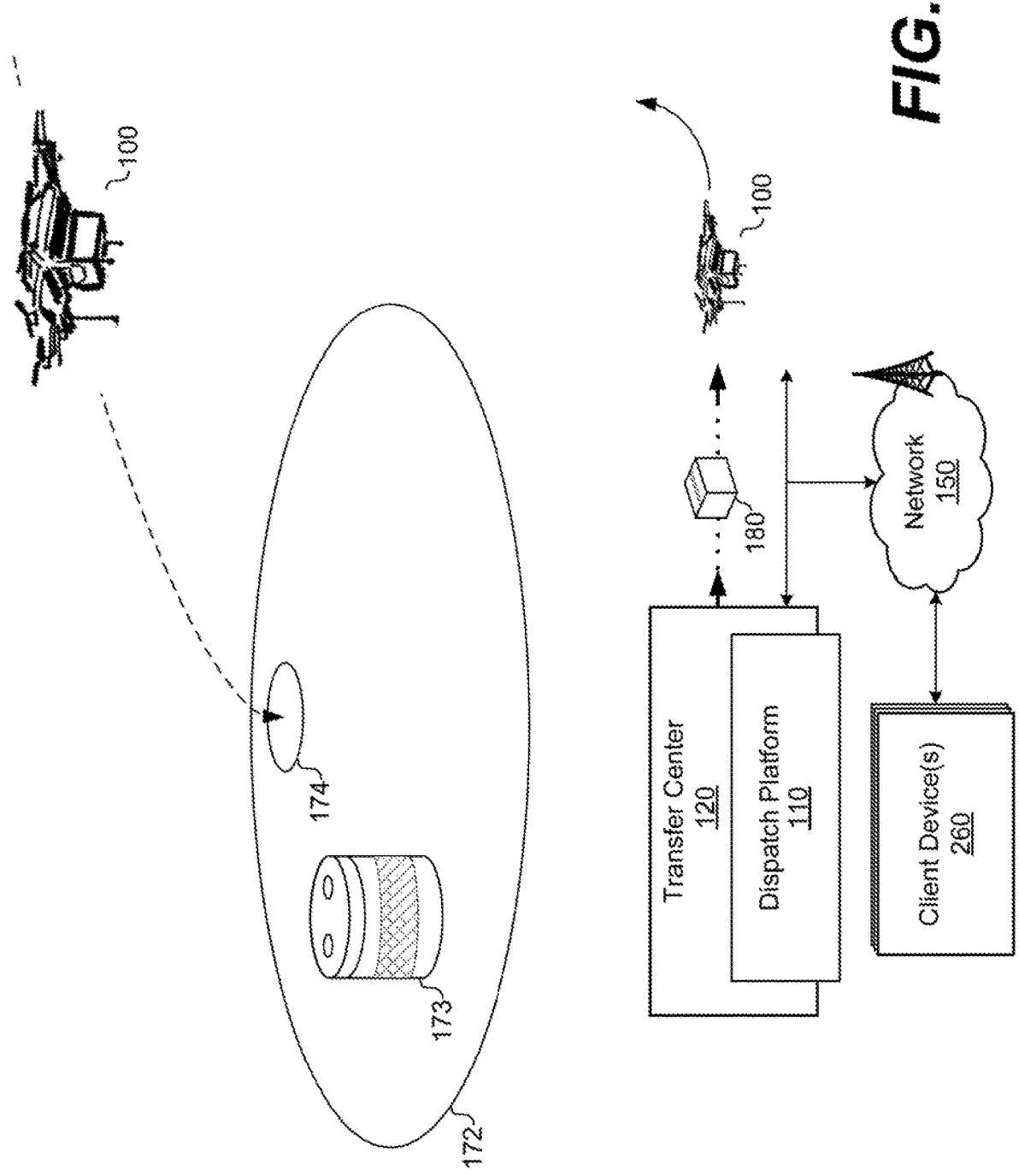
FIG. 1 illustrates an example system according to one embodiment of the present disclosure.

Turning to FIG. 1 for additional context, FIG. 1 illustrates an example system for delivery using an autonomous carrier 100 according to one embodiment of the present disclosure. The system includes a dispatch platform 110, a transfer center 120, a network 150, and one or more client devices 260. The system provides an autonomous delivery or transfer service that delivers items to a destination or transfers items between facilities.

The dispatch platform 110 can be embodied as one or more computing devices arranged, for example, in one or more server or computer banks. The dispatch platform 110 can be a logistics system, an electronic marketplace, an inventory management system, or other systems that can facilitate tracking or dispatching of deliver an electronic marketplace for selling items, goods, and/or services. In that context, the dispatch platform 110 can facilitate online purchases over the network 150. The dispatch platform 110 can also perform various back end functions associated with the online presence of a merchant to facilitate the online purchases. For example, the dispatch platform 110 can generate network pages, such as web pages or other types of network content, that are provided to the client devices 260 for selecting items delivery or transfer by an autonomous carrier 100.

The network 150 can include the Internet, intranets, extranets, wide area networks (WANs), local area networks (LANs), wired networks, wireless networks, cellular networks, cable networks, satellite networks, other suitable networks, or any combination thereof. The autonomous carrier 100, the dispatch platform 110, and the client devices 260 can communicate with each other using any suitable application layer, transport layer, and internet layer protocols and systems interconnect frameworks.

The client devices 260 are representative of one or a plurality of client devices of one or more users. The client devices 260 can be embodied as any computing device or system, including but not limited to those embodied in the form of a desktop computer, a laptop computer, a cellular telephone, or a tablet computer, among other example computing devices and systems.

A request, such as an order or instruction to transfer an item, can be placed through the network 150 to the dispatch platform 110 using one of the client devices 260. The order is submitted from the dispatch platform 110 to the transfer center 120 for fulfillment. At the transfer center 120, one or more items from the request can be prepared and packaged into a package 180. In turn, the transfer center 120 provides the package 180 to the autonomous carrier 100 as a payload for delivery, along with a destination address or coordinates for the delivery.

The autonomous carrier 100 can secure the package 180 to a land-based or air-based autonomous vehicle for delivery. After the package 180 is secured to the autonomous carrier 100, the autonomous carrier 100 can be used to autonomously (or semi-autonomously) provide delivery of the package 180 to the destination. The autonomous carrier 100 is configured to determine its flight path or follow a provided flightpath and control its flight operation along the flight path to the destination 172.

According to examples of the disclosure, a connected speaker 173 can be utilized to facilitate selection of a specific location 174 within the destination 172 at which the package 180 can be delivered. A specific location 174 can comprise a particular feature, object, or more specific destination within the destination 172. For example, the destination 172 can comprise an address and a specific location 174 can specify the driveway located at the destination 172, a loading dock number at the destination 172, a visual marker at the destination 172, or another specific area within the destination 172.

Accordingly, the connected speaker 173 can communicate with the autonomous carrier 100 by playing or broadcasting an encrypted audio signal, which can be encoded in a frequency range that is inaudible to most human hearing, that identifies the specific location 174 at which the package 180 can be delivered by the autonomous carrier 100. The encrypted audio signal can include an identifier that identifies the specific location 174. The identifier can be a textually descriptive identifier or a numeral identifier. The identifier can be a descriptive textual tag that describes a physical feature at the destination 172, such as "driveway," "mailbox," "front yard," "backyard," etc. The identifier can also include an alphanumeric identifier that corresponds to a quick response (QR) code or other identifier with which specific location 174 is tagged. A specific location 174 at a destination 172 can also be marked with other types of identifiers, such as Bluetooth low-energy (BLE) beacons, near-field communication (NFC) tags, augmented reality (AR) markers, or other mechanisms with which an identifier can be associated.

As described below, in response to receiving the identifier, the autonomous carrier 100 can complete delivery of the package 180 to the specific location 174 provided by the connected speaker 173 to the autonomous carrier 100.

Figure 2:
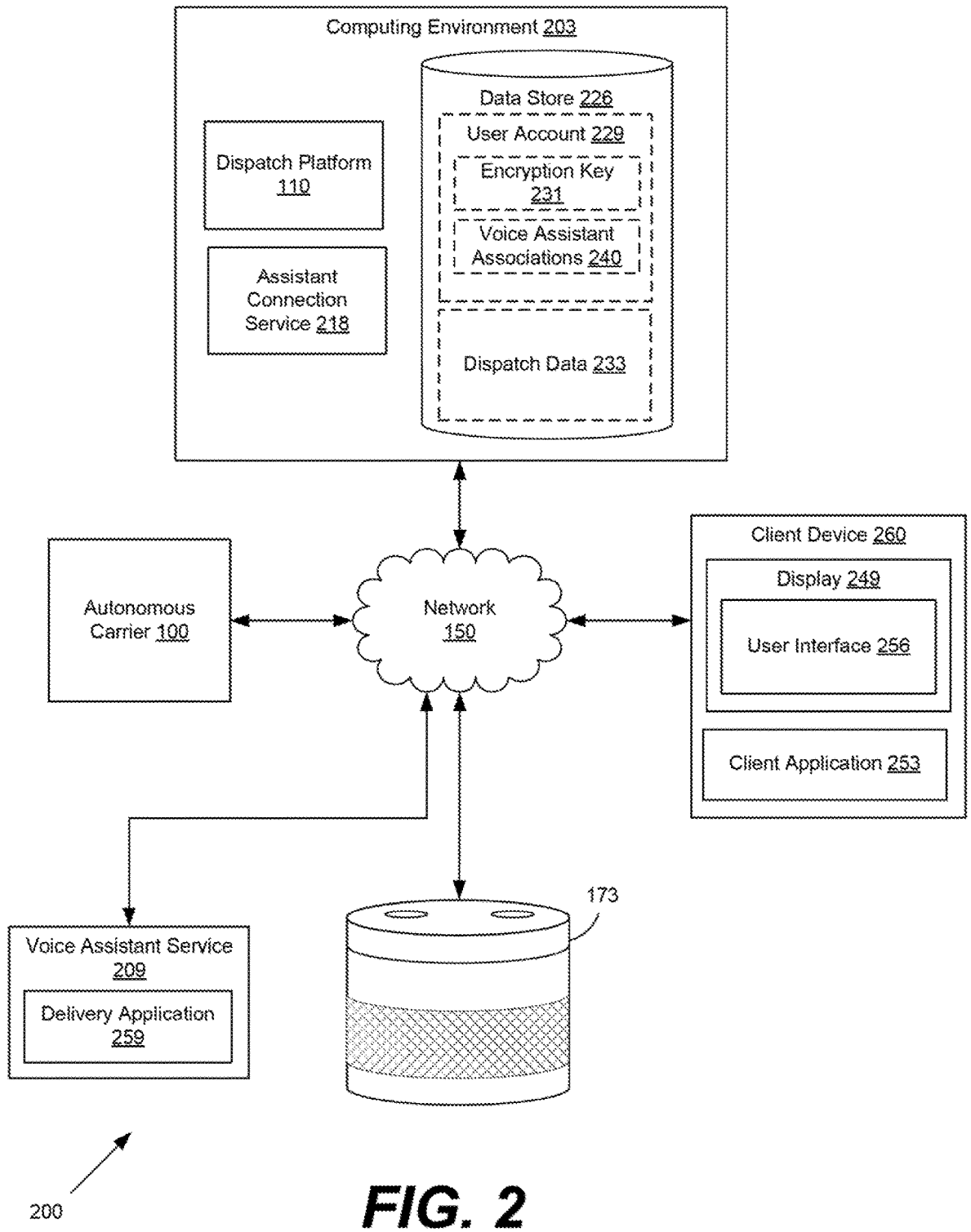
FIG. 2 illustrates a block diagram of various components of an autonomous carrier from FIG. 1 according to various embodiments of the present disclosure.

Referring next to FIG. 2, shown is an example of a networked environment 200. The networked environment 200 includes a computing environment 203, client devices 260, connected speaker 173, autonomous carrier 100, and a voice assistant service 209, which are in data communication with each other across a network 212. The connected speaker 173 can be located at a destination 172. In some embodiments, location beacons, proximity sensors, pressure sensors, or other localized sensors can be located at the destination 172 and can also be in communication with the network 212. Location beacons or other localized sensors may or may not have the ability to communicate over the network 212 and, in some instances, might only be equipped with short range communication interfaces, such as Bluetooth, that are in communication with the connected speaker 173.

The network 212 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 212 can also include a combination of two or more networks 150. Examples of networks 150 can include the Internet, intranets, extranets, virtual private networks (VPNs), and similar networks.

The computing environment 203 can include, for example, a server computer or any other system providing computing capability. Alternatively, the computing environment 203 can employ a plurality of computing devices that can be arranged, for example, in one or more server banks or computer banks or other arrangements. These computing devices can be located in a single installation or can be distributed among many different geographical locations. For example, the computing environment 203 can include a plurality of computing devices that together can include a hosted computing resource, a grid computing resource or any other distributed computing arrangement. In some cases, the computing environment 203 can correspond to an elastic computing resource where the allotted capacity of processing, network, storage, or other computing-related resources can vary over time.

Various applications or other functionality can be executed in the computing environment 203 according to various examples. The components executed in the computing environment 203 can include a dispatch platform 110. The dispatch platform 110 can initiate delivery of a package 180 by an autonomous carrier 100 according to examples of the disclosure. Also, various data is stored in a data store 226 that is accessible to the computing environment 203. The data store 226 can be representative of a plurality of data stores, which can include relational databases, object-oriented databases, hierarchical databases, hash tables or similar key-value data stores, as well as other data storage applications or data structures. The data stored in the data store 226 is associated with the operation of the dispatch platform 110 as well as potentially other applications or functional entities described later. This data can include one or more user accounts 229, dispatch data 233, and potentially other data.

The dispatch platform 110 can coordinate the dispatching and delivery of items from a transfer center 120 to a destination 172. In some examples, the dispatch platform 110 can provide a user interface through which users can request or order delivery or transfer of an item to the destination 172. In one example, the dispatch platform 110 can involve users ordering items from a marketplace. In another example, the dispatch platform 110 can involve users requesting items to be moved from one facility to another facility by a logistics platform. The dispatch platform 110 can take various forms so long as the dispatch platform 110 initiates delivery of an item by an autonomous carrier 100 to a destination 172.

The assistant connection service 218 can facilitate communication with the connected speaker 173 by the dispatch platform 110. The assistant connection service 218 can communicate with a voice assistant service 209, which can be operated by a third party, to provide information about items that are dispatched to a destination 172 associated with a connected speaker 173.

The user account 229 represents information associated with a user. The information can include authentication credentials, one or more single sign-on tokens, access permissions applied to the user account, and other user-specific information that can facilitate operation of the dispatch platform 110. The user account 229 can store information about client devices 260 as well as connected speaker 173 that are associated with a transaction to facilitate embodiments of the disclosure. Additionally, the user account 229 can include an encryption key 231. The encryption key 231 can be associated with and stored on the connected speaker 173. The encryption key 231 can be utilized to encrypt audio signals generated by the connected speaker 173 for communication with the autonomous carrier 100. In one example, the encryption key 231 can be distributed to the connected speaker 173 by a management service with which the connected speaker 173 is enrolled as a managed device. In another example, the encryption key 231 can be distributed to the connected speaker 173 when provided by the dispatch platform 110 or a management system with which the connected speaker 173 is enrolled as a managed device.

In some implementations, rather than a single encryption key 231 being utilized, asymmetric encryption can be utilized whereby a key pair, such as a public and private key, can be utilized to encrypt and decrypt information such as audio signals played back by the connected speaker 173.

The user account 229 can further include information about a destination 172 associated with a user. A destination 172 can comprise a delivery address, coordinates, or other identifying information about where a package 180 can be delivered by an autonomous carrier 100. The information about the destination 172 can also include information about one or more specific location 174 at the destination 172. A specific location 174 can comprise more granular location information than a delivery address, for example. A specific location 174 can identify a driveway, a delivery monument that is marked with identifying information, such as a QR code, alphanumeric identifier, color, or shape, or any landmark at the destination 172 that can be selected as a location for delivery of the package 180. The delivery application 259 can select the specific location 174 for a delivery upon or after dispatching of the package 180 to the destination 172.

The delivery application 259 can select the specific location 174 with input from a user via the client device 260, from sensors at the destination 172 that reflect the current environmental conditions, or by selecting the most appropriate specific location 174 based upon aspects of the package 180, such as its contents, dimensions, weight, or value.

Dispatch data 233 can represent orders, requests or instructions to dispatch an item from one location to a destination 172. The dispatch data 233 can identify an item as well as a destination 172 to which the item is being transferred or shipped by an autonomous carrier 100. The dispatch data 233 can also include a reference to an encryption key 231 with which an audio signal provided by the connected speaker 173 to an autonomous carrier 100 can be encrypted. In some examples, the encryption key 231 can be generated by the dispatch platform 110 and associated with a user account 229.

For example, the dispatch platform 110 can receive a request to deliver or transfer an item from a user associated with the user account 229. The dispatch platform 110 can obtain the encryption key 231 from the data store 226 and provide the encryption key 231 to the autonomous carrier 100 when the autonomous carrier 100 is dispatched to the destination 172. The connected speaker 173 can also be associated with the user account 229 and can be provisioned with the encryption key 231. The connected speaker 173 can play an encrypted sound signal that can be decrypted by the autonomous carrier 100 using the encryption key 231. The encrypted sound signal can direct the autonomous carrier 100 to a specific location 174 within the destination 172.

Voice assistant associations 240 can specify one or more connected speaker 173 that are associated with a user account 229 and with which a user has authenticated. Once a voice assistant association 240 is established that links a connected speaker 173 and user account 229, the assistant connection service 218 can provide data to and from the connected speaker 173 on behalf of the dispatch platform 110 or third party services. Other information about the user can also be stored as part of the user account 229, such as the user's name, organization, order history, authentication credentials, or contact information.

The client device 260 is representative of a plurality of client devices 260 that can be coupled to the network 212. The client device 260 can include, for example, a processor-based system such as a computer system. Examples of these computer systems can include a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The client device 260 can include one or more displays 249, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 260 or can be connected to the client device 260 through a wired or wireless connection.

The client device 260 can execute various applications such as one or more client applications 253. The client application 253 can cause a user interface 256 to be rendered on the display 249. The client application 253 can represent various types of applications executable by the client device 260. For example, the client application 253 could be a browser and the user interface 256 could include a page rendered within a browser window. As another example, the client application 253 could be an email application and the user interface 256 could represent a graphical user interface for viewing, editing, and composing emails.

Additionally, the client application 253 can represent an application that facilitates communication with the dispatch platform 110. By manipulating the user interface 256, a user can submit an order or request to transfer an item to a destination 172 using an autonomous carrier 100. Additionally, the user can authenticate his or her identity with the dispatch platform 110 using the client application 253 and associate a connected speaker 173 with the user account 229 using the client application 253. To this end, the client device 260 can include one or more local area network interfaces, microphones, speakers, or cameras that facilitate communication with a connected speaker 173. The client device 260 can also include a Bluetooth or other short range communications interface to communicate with the connected speaker 173.

The connected speaker 173 represents a speaker that can communicate with the network 212. The connected speaker 173 can be a smart speaker or any device that has a microphone and audio playback capability to provide a voice assistant experience. A voice assistant experience means an experience in which a user can provide spoken commands or requests that are captured by one or more microphones integrated with or in communication with the connected speaker 173, and the connected speaker 173 can play back audio using a speaker in response to the spoken commands or requests. For example, a user can ask the connected speaker 173 to play music or retrieve information from the Internet, and the connected speaker 173 can cause playback of the requested music or information through an integrated speaker or an audio playback device in communication with the connected speaker 173. The connected speaker 173 can also have a Bluetooth or other network interface that can be utilized to communicate with sensors that are present at the destination 172. The sensors present at the destination 172 can comprise motion, pressure, audio, or other sensors that ca detect the present of an autonomous carrier 100 or an item being delivered by the autonomous carrier 100 to a specific location 174 at the destination 172 as directed by the connected speaker 173.

The voice assistant service 209 can communicate with the connected speaker 173 to process voice commands and facilitate retrieval of information for playback through the connected speaker 173. The voice assistant service 209 can perform voice recognition or speech-to-text conversion on audio captured by the connected speaker 173, identify a command or action to perform in response to the captured audio, and response to the connected speaker 173 audio that should be played back through the connected speaker 173. The voice assistant service 209 can also provide an API so that third parties can create applications or extend the capabilities of the connected speaker 173. These applications or capabilities can be implemented within a cloud-based voice assistant service 209 so that the functionality does not need to be implemented within every connected speaker 173 that is deployed in order for extended capabilities to be available to every user.

The delivery application 259 can be implemented within an API framework provided by the voice assistant service 209 and facilitate communication between the connected speaker 173 and the dispatch platform 110. For example, the delivery application 259 can be implemented in a cloud-based environment as a skill or extension of the connected speaker 173 that can enabled or installed by the user on the connected speaker 173. The delivery application 259 can operate within the confines of a cloud-based environment of the voice assistant service 209, which can be operated by a third party.

Accordingly, the delivery application 259 can communicate with the assistant connection service 218, which can in turn communicate with the dispatch platform 110 to obtain an indication of the dispatch of an item to a destination 172 associated with the connected speaker 173. The delivery application 259 can identify a specific location 174 at the destination 172 and cause the connected speaker 173 to play back an audio signal in which an identifier associated with the specific location 174 is embedded. The autonomous carrier 100, as it is approaching the specific location 174, can obtain the audio signal and extract identifying information about the specific location 174. The autonomous carrier 100 can then deliver the item to the specific location 174.

In some examples or implementations, the delivery application 259 can be executed within the connected speaker 173 by a processor embedded in the connected speaker 173. However, in scenarios where a third party assistant ecosystems is utilized, the delivery application 259 is often implemented using an assistant ecosystem API framework and executed in a cloud-based environment such as the voice assistant service 209, which is often operated by a third party.

The autonomous carrier 100 represents an air or land-based vehicle, such as a drone, truck, automobile, or other vehicle. The autonomous carrier 100 can be equipped with a network interface to communicate with the network 212. The autonomous carrier 100 can also include a microphone system that can be used to listen for audio signals received from a connected speaker 173 as the autonomous carrier 100 is delivering an item to a destination 172.

The autonomous carrier 100 can include a computing device that can facilitate navigation to the destination 172. The autonomous carrier 100 can have access to mapping data that allows the autonomous carrier 100 to plot a safe pathway to the destination 172. Additionally, the autonomous carrier 100 can be provided with the encryption key 231 associated with a particular delivery. An audio signal broadcast by the connected speaker 173 can be encrypted with the encryption key 231. Accordingly, the autonomous carrier 100 can decrypt the encrypted signal with the encryption key 231 to extract identifying information about a specific location 174 at which an item should be delivered by the autonomous carrier 100.

The autonomous carrier 100 can also include a flight controller, the flight sensors, camera systems, and other sensors to facilitate autonomous travel. Among other components, the autonomous carrier 100 can include a rotor system and landing gear. The autonomous carrier 100 can carry a package 180. The package 180 can also be released away from the autonomous carrier 100 by a release mechanism at the destination 172.

The autonomous carrier 100 can store flight control data, which can include any data necessary to control the flight of the autonomous carrier 100, such as operations and/or control algorithms, flight reference data (e.g., flight path, starting, ending, waypoint data, etc.), map data, weather data, etc. Delivery data can include data related to the delivery of the package 180, such as map or coordinate system data, address data, and/or scheduling. The flight control data can include land topography data as well as information about what artificial (e.g., man-made) features are expected over various geographic regions. For example, the flight control data can identify the locations and boundaries of bodies of water, rivers, fields, forested areas, hills, mountains, and other topography data. Additionally, the flight control data can identify the locations and boundaries of residential, commercial, and industrial buildings and developments, highways and surface streets, parking lots, stadiums, schools, recreational areas, and other artificial features. The flight control data can also include certain rankings, metrics, or priority values for the natural and artificial features.

The flight controller can be embodied, at least in part, as one or more specific- or general-purpose processors, processing circuits, computers, processing devices, or computing devices having memory. The flight controller can also be embodied, in part, as various functional and/or logic (e.g., computer-readable instructions, code, firmware, etc.) elements executed or operated to direct the operations and functions described herein.

The autonomous carrier 100 can include flight sensors, such as cameras, multi-dimensional camera arrays, infrared or thermal sensors, radar sensors, laser-based survey sensors (e.g., LIDAR), electro-optical/infrared sensor packages, micro- or nano-electromechanical system (NEMS or MEMS) or other accelerometers, gyroscopes, or orientation sensors, global positioning system (GPS) sensors, height, altitude, or altimeter sensors, ultrasonic sensors, atmospheric pressure sensors, etc.

The flight sensors can provide data for navigation of the autonomous carrier 100 along its flight path and during the execution of directed fragmentation sequences. For example, data from one or more of the flight sensors can be provided to the flight controller for navigation of the autonomous carrier 100 to a destination 172.

The autonomous carrier 100 can also include a communications interface, which can be any suitable interface for communicating data, such as a cellular interface (e.g., Global System for Mobile communications ("GSM"), Code Division Multiple Access ("CDMA"), Local Multi-point Distribution Systems ("LMDS"), Long Term Evolution ("LTE"), Multi-channel-Multi-point Distribution System ("MMDS"), etc.), a Bluetooth interface, a Wireless Local Area Network ("WLAN") (e.g., 802.11 or 802.16) interface, other similar interfaces, or any combination thereof.

In the context of this disclosure, the dispatch platform 110 can facilitate delivery of an item by an autonomous carrier 100 to a specific location 174 at the destination 172. The connected speaker 173 can communicate with the autonomous carrier 100 by playing a sound signal that identifies the specific location 174 based upon a user selection of the specific location 174, sensor data detected by the connected speaker 173 at the specific location 174, or other environmental conditions. Also in the context of this disclosure, any functionality discussed as being performed by the dispatch platform 110, delivery application 259, or assistant connection service 218 can be performed in a single application or service.

Figure 3:
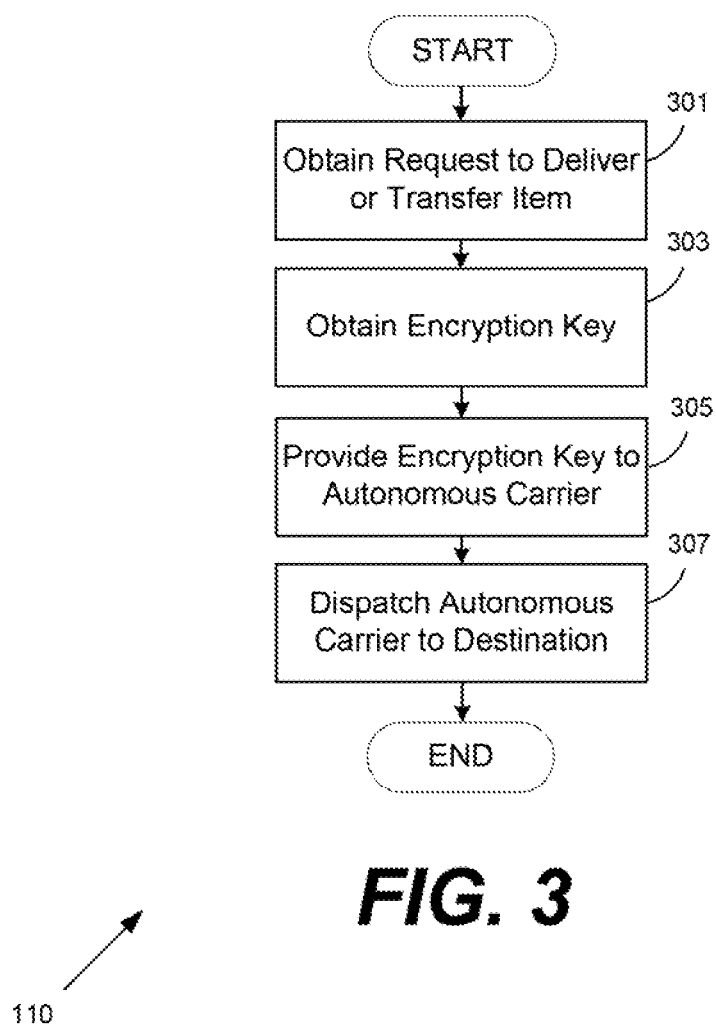
FIG. 3 illustrates an example network environment according to various embodiments of the present disclosure.

FIG. 3 is a flowchart of an example process according to examples of the disclosure. FIG. 3 illustrates how the dispatch platform 110 can dispatch an autonomous carrier 100 to the destination 172.

First, at step 301, the dispatch platform 110 can obtain a request to deliver or transfer an item to a destination 172. The request can be generated as a result of an order or request to move an item by a user. The request can be generated in response to a user submitting an order or request from a client device 260 to the dispatch platform 110. The dispatch platform 110 can determine whether the requesting user's user account 229 is linked to a connected speaker 173 that can facilitate selection of a specific location 174 at the destination 172.

If so, at step 303, the dispatch platform 110 retrieves the encryption key 231 associated with the user account 229 of the user. The encryption key 231 can be used by the delivery application 259 to encrypt an audio signal played by the connected speaker 173 with identifying information about the specific location 174 at which the package 180 can be delivered.

At step 305, the dispatch platform 110 can provide the encryption key 231 to the autonomous carrier 100. The autonomous carrier 100 can be equipped with a processor that can perform a decryption process on an encrypted audio signal or encrypted sound signal. The autonomous carrier 100 can also be equipped with a microphone system that can capture audio played by a connected speaker 173. The audio signal can comprise an ultrasonic or infrasonic sound in which digital information is embedded using steganography or another embedding process. In other words, the audio signal can be generated such that is contains frequencies below 20 Hertz or above 20,000 Hertz, which is the typical audible range for human hearing.

At step 307, the dispatch platform 110 can dispatch the autonomous carrier 100 to the destination 172 with the package 180. The dispatch platform 110 can dispatch the autonomous carrier 100 by providing the dispatch platform 110 and the destination 172 to the autonomous carrier 100. In some examples, the dispatch platform 110 can also provide a flight plan or route to the destination 172, which the autonomous carrier 100 can follow using onboard navigation systems. Thereafter, the process proceeds to completion.

Figure 4:
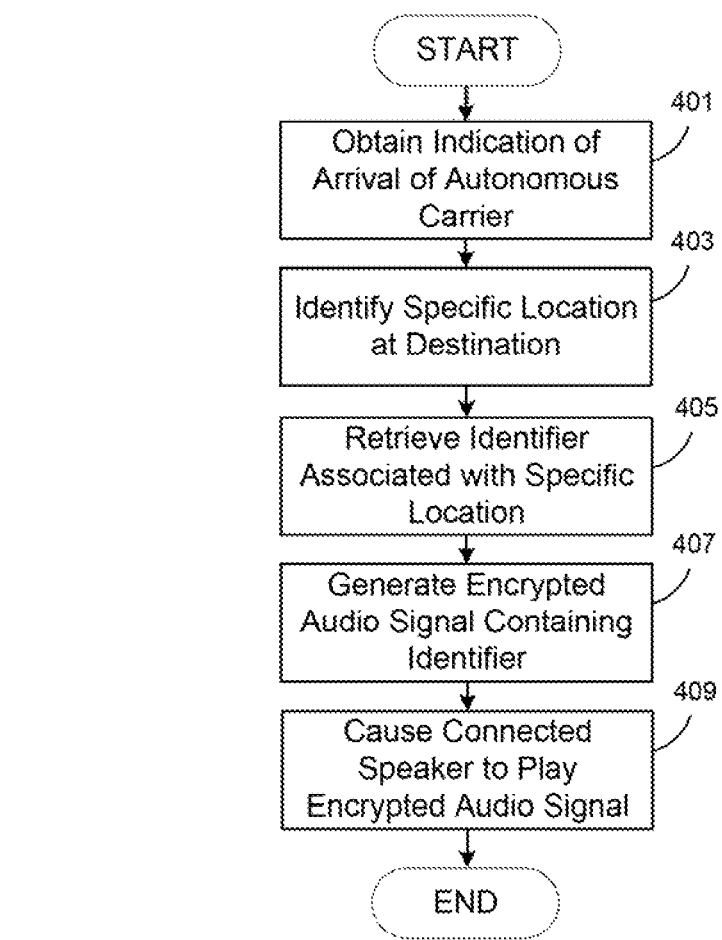
FIG. 4 illustrates a flow diagram of an example process according to various embodiments of the present disclosure.

FIG. 4 illustrates a flow diagram of an example process according to various examples of the present disclosure. FIG. 4 illustrates how the delivery application 259 can communicate with an autonomous carrier 100 to identify a specific location 174 at a destination 172 using the connected speaker 173.

First, at step 401, the delivery application 259 can obtain an indication of an arrival of an autonomous carrier 100 to the destination 172 associated with a connected speaker 173. The indication can be a multi-faceted indication.

For example, first a delivery alert that corresponds to an initial dispatching of an autonomous carrier 100 to the destination 172 can be generated by the dispatch platform 110. In causing the initial dispatching, the dispatch platform 110 can determine whether the delivery location associated with an order or request to transfer an item to a destination 172 is associated with a user account 229 that is also linked to a connected speaker 173 that can facilitate selection of a specific location 174 at the destination 172. If the destination 172 is linked to a connected speaker 173, the dispatch platform 110 can obtain an encryption key 231 associated with the user account 229 and provide the encryption key 231 to the autonomous carrier 100.

Next, the dispatch platform 110 can notify the delivery application 259 that delivery of a particular package 180 has been dispatched to a particular destination 172 selected for the item. The dispatch platform 110 can also request that the delivery application 259 select a specific location 174 at the destination 172 for delivery of the package 180 and communicate the specific location 174 to the autonomous carrier 100 using the connected speaker 173.

At step 403, the delivery application 259 can select a specific location 174 associated with the destination 172. The selection of the specific location 174 can be performed in various ways. In a first example, the specific location 174 can be selected by the dispatch platform 110 and provided to the delivery application 259. In another example, the specific location 174 can be selected by the delivery application 259 based upon the dimensions, value, item type, or other properties of the package 180.

As noted above, a destination 172 can have multiple specific locations 174 that have varying properties and appropriateness for accepting different types of items. Accordingly, the delivery application 259 can select the specific location 174 based upon the attributes of the package 180.

For example, a specific location 174 can be associated with a weight or value range. Accordingly, a package 180 of a particular weight or value can be selected for delivery in a specific location 174 that matches the weight or value range of the package 180. As another example, certain package types might be associated with a certain specific location 174. Accordingly, the specific location 174 can be chosen based on the type of item matching the specific location 174.

As another example, the specific location 174 can be selected based upon whether other specific locations 174 at the destination 172 are obstructed or occupied by other items or obstructions. The delivery application 259 can determine whether a specific location 174 is obstructed based upon sensors, such as cameras, proximity sensors, pressure sensors, or other sensors at specific locations 174 at the destination 172. The delivery application 259 can select a specific location 174 that is unobstructed.

The delivery application 259 can sense the approach of an autonomous carrier 100 at a destination 172 using various sensors at the destination 172. Additionally, the approach of an autonomous carrier 100 can also be detected through a time-based mechanism. In this scenario, when a scheduled delivery time occurs, the connected speaker 173 can play a sound signal containing an identifier of a specific location 174 or other information for a predetermined time period when the delivery would likely occur or when the autonomous carrier 100 is likely at the destination 172. Also, several different encrypted sounds can be played in a loop corresponding to several deliveries expected in the same time period. As and when confirmation of a delivery is detected using sensors or other inputs, the corresponding sound signal or snippet can be deleted from the loop.

As another example, the specific location 174 can be selected by the user via the client application 253 on a client device 260. The specific location 174 can be selected by the user and provided to the delivery application 259, which can in turn provide an identifier of the specific location 174 to the autonomous carrier 100 during delivery of the package 180.

At step 405, the delivery application 259 can retrieve an identifier associated with the selected specific location 174. The identifier can comprise an identifier physically marked on the specific location 174, such as a QR code or alphanumeric identifier at the specific location. The identifier can also comprise descriptive text associated with the specific location 174, such as a physical description of the specific location 174. The autonomous carrier 100 can be instrumented to identify a specific location 174 based upon descriptive text using a dictionary available to the autonomous carrier 100. The dictionary can associate textual tags or descriptive terms with imagery, and a computer-vision analysis of the destination 172 can be performed to identify the specific location 174. The identifier can also comprise a reference image associated with the specific location 174. The autonomous carrier 100 can utilize image recognition or computer vision techniques to match the reference image with live imagery of the specific location 174.

The specific location 174 can also be selected by the user. The selection can be made using the client device 260. Once selected, the user's selection can be provided to the delivery application 259, which can retrieve the identifier associated with the specific location 174 with which the location can be identified.

At step 407, the delivery application 259 can generate an audio signal in which the identifier is embedded. The audio signal can be encrypted using the encryption key 231. The identifier can be encrypted and then embedded into an ultrasonic or infrasonic sound using steganography or another embedding technique.

At step 409, the delivery application 259 can cause the connected speaker 173 to play the encrypted audio signal. The delivery application 259 can cause playback of the audio signal at an expected time of arrival, which can be provided by the dispatch platform 110 to the connected speaker 173. The delivery application 259 can also cause the connected speaker 173 to play back the audio signal when proximity of the autonomous carrier 100 is detected by one or more sensors at the destination 172 that are in communication with the connected speaker 173.

The autonomous carrier 100 can extract the encrypted data from the audio signal. The autonomous carrier 100 can decrypt the encrypted data using the encryption key 231. The identifier can be extracted from the decrypted data, which can identify the specific location 174 for the autonomous carrier 100.

In some examples of the disclosure, the delivery application 259 can confirm delivery of the package 180 in response to data from sensors at the destination 172. For example, pressure sensors, cameras or any other equipment deployed can confirm the package 180 being dropped off at the specific location 174. In this scenario, the connected speaker 173 can also play back a delivery confirmation code or identifier that can be encrypted using the encryption key 231. The delivery confirmation code can be captured by the autonomous carrier 100. The autonomous carrier 100 can report the delivery confirmation code back to the dispatch platform 110 over the network 212. Delivery confirmation can then be provided to the client application 253 or the dispatch platform 110.

In another example of the disclosure, the delivery application 259 can also serve to allow a user to declare a temporary no-fly zone for a particular destination 172 to delivery service providers. This could be useful in cases where the user temporarily does not want any autonomous carrier 100 approaching the destination 172. Additionally, the no-fly zone can prevent autonomous carrier 100 drones from flying or hovering over the destination 172 on their way to perform deliveries to the user or others in the vicinity. The delivery application 259 can cause the connected speaker 173 to play a no-fly signal instructed an autonomous carrier 100 to avoid the area if the no-fly signal is detected. An autonomous carrier 100 can capture the audio signal and also inform the dispatch platform 110, which can instruct other deliveries to avoid the destination 172.

In another example of the disclosure, the connected speaker 173 can also be utilized as a backup communication link to the autonomous carrier 100 from the dispatch platform 110. In the event that connectivity to the network 212 is lost by the autonomous carrier 100, the dispatch platform 110 can provide communications to the connected speaker 173, such as navigation or guidance commands with respect to the package 180. The connected speaker 173 can provide navigation or guidance commands to the autonomous carrier 100 by playing back a command through the speaker, which can be captured by the autonomous carrier 100.

Utilizing the connected speaker 173 as a backup communication link can be important in cases where general communication links with the autonomous carrier 100 have been severed either due to malfunction or weather conditions. In such cases, when the autonomous carrier 100 is detected to communicate with a connected speaker 173, dispatch platform 110 could be notified and accordingly relay commands through the connected speaker 173 to an autonomous carrier 100. The connected speaker 173 in this scenario might be unrelated to the destination 172 at which the autonomous carrier 100 is being routed. For example, the connected speaker 173 might be one that is located at a waypoint or that is detected to be on the way to or nearby the destination 172.

It should be appreciated that the process flows shown in FIGS. 3-4 can vary as compared to that shown. The flowchart or processes in FIGS. 3-4 show examples of the functionality and operation of implementations of components described herein. The components described herein can include hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 3-4 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all variations are within the scope of the present disclosure.

The components described herein can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit.

The components described herein can be embodied in the form of hardware, as software components that are executable by hardware, or as a combination of software and hardware. If embodied as hardware, the components described herein can be implemented as a circuit or state machine that employs any suitable hardware technology. This hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All modifications and variations are intended to be included herein within the scope of this disclosure.

What is claimed is:

1. A system comprising:
   at least one computing device;
   at least one application executed by the at least one computing device, the at least one application causing the at least one computing device to at least:
   obtain an indication of an arrival of an autonomous carrier at a destination associated with a user;
   identify a specific location at the destination associated with the user;
   embed an identifier associated with the specific location into an audio signal;
   obtain an encryption key associated with the destination, wherein the encryption key is associated with a user account corresponding to the destination and obtained from a system dispatching the autonomous carrier;
   generate an encrypted audio signal from the audio signal;
   cause the encryption key associated with the user account corresponding to the location to be provided to the autonomous carrier, the encryption key provided to the autonomous carrier by the system dispatching the autonomous carrier; and
   transmit the encrypted audio signal to a connected speaker associated with the destination, wherein the connected speaker causes playback of the encrypted audio signal during the arrival of the autonomous carrier, wherein the autonomous carrier decrypts the audio signal to identify the specific location at the destination.

2. The system of claim 1, wherein selection of the specific location is obtained from a client device associated with the user, the selection comprising an identifier of a physical feature of the destination.

3. The system of claim 2, wherein the identifier comprises a descriptive textual tag identifying the physical feature, wherein the autonomous carrier identifies the physical feature based upon an image dictionary corresponding to the descriptive textual tag.

4. The system of claim 1, wherein the encrypted audio signal comprises a signal encoded at a frequency that is ultrasonic or infrasonic.

5. The system of claim 1, wherein the at least one application further causes the at least one computing device to at least:
   obtain the indication of the arrival of the autonomous carrier from a sensor located at the destination; and
   generate selection of the specific location based upon a location of the sensor at the destination.

6. The system of claim 1, wherein the at least one application further causes the at least one computing device to at least:
   embed information about at least one area at the destination on which landing is prohibited into the audio signal.

7. A method comprising:
   obtaining an indication of an arrival of an autonomous carrier at a destination associated with a user;
   identifying a specific location at the destination associated with the user;

embedding an identifier associated with the specific location into an audio signal;

obtaining an encryption key associated with the destination, wherein the encryption key is associated with a user account corresponding to the destination and obtained from a system dispatching the autonomous carrier;

generate an encrypted audio signal from the audio signal;

causing the encryption key associated with the user account corresponding to the location to be provided to the autonomous carrier, the encryption key provided to the autonomous carrier by the system dispatching the autonomous carrier; and transmitting the encrypted audio signal to a connected speaker associated with the destination, wherein the connected speaker causes playback of the encrypted audio signal during the arrival of the autonomous carrier, wherein the autonomous carrier decrypts the audio signal to identify the specific location at the destination.

8. The method of claim 7, wherein selection of the specific location is obtained from a client device associated with the user, the selection comprising an identifier of a physical feature of the destination.

9. The method of claim 8, wherein the identifier comprises a descriptive textual tag identifying the physical feature, wherein the autonomous carrier identifies the physical feature based upon an image dictionary corresponding to the descriptive textual tag.

10. The method of claim 7, wherein the encrypted audio signal comprises a signal encoded at a frequency that is ultrasonic or infrasonic.

11. The method of claim 7, further comprising:
obtaining an encryption key from a system dispatching the autonomous carrier; and
generating the encrypted audio signal using the encryption key, wherein the autonomous carrier decrypts the audio signal using the encryption key obtained from the system dispatching the autonomous carrier.

12. The method of claim 7, further comprising:
obtaining the indication of the arrival of the autonomous carrier from a sensor located at the destination; and
generating selection of the specific location based upon a location of the sensor at the destination.

13. The method of claim 7, further comprising embedding information about at least one area at the destination on which landing is prohibited into the audio signal.

14. A non-transitory computer-readable medium embodying instructions executable by at least one computing device, the instructions causing the at least one computing device to at least:
obtain an indication of an arrival of an autonomous carrier at a destination associated with a user;
identify a specific location at the destination associated with the user;
embed an identifier associated with the specific location into an audio signal;
obtain an encryption key associated with the destination, wherein the encryption key is associated with a user account corresponding to the destination and obtained from a system dispatching the autonomous carrier;
generate an encrypted audio signal from the audio signal;
cause the encryption key associated with the user account corresponding to the location to be provided to the autonomous carrier, the encryption key provided to the autonomous carrier by the system dispatching the autonomous carrier; and
transmit the encrypted audio signal to a connected speaker associated with the destination, wherein the connected speaker causes playback of the encrypted audio signal during the arrival of the autonomous carrier, wherein the autonomous carrier decrypts the audio signal to identify the specific location at the destination.

15. The non-transitory computer-readable medium of claim 14, wherein selection of the specific location is obtained from a client device associated with the user, the selection comprising an identifier of a physical feature of the destination.

16. The non-transitory computer-readable medium of claim 14, wherein the encrypted audio signal comprises a signal encoded at a frequency that is ultrasonic or infrasonic.

17. The non-transitory computer-readable medium of claim 14, wherein the instructions cause the at least one computing device to at least:
obtain an encryption key from a system dispatching the autonomous carrier; and
generate the encrypted audio signal using the encryption key, wherein the autonomous carrier decrypts the audio signal using the encryption key obtained from the system dispatching the autonomous carrier.

18. The non-transitory computer-readable medium of claim 14, wherein the instructions cause the at least one computing device to at least:
obtain the indication of the arrival of the autonomous carrier from a sensor located at the destination; and
generate selection of the specific location based upon a location of the sensor at the destination.

19. The non-transitory computer-readable medium of claim 14, wherein the instructions further cause the at least one computing device to at least:
embed information about at least one area at the destination on which landing is prohibited into the audio signal.

* * * * *